United States Patent
Liu et al.

(10) Patent No.: US 10,326,157 B2
(45) Date of Patent: Jun. 18, 2019

(54) MODIFIED SOLID OXIDE FUEL CELL

(71) Applicant: Phillips 66 Company, Houston, TX (US)

(72) Inventors: Mingfei Liu, Bartlesville, OK (US); Ting He, Idaho Falls, ID (US); Ying Liu, Bartlesville, OK (US); David M. Bierschenk, Bartlesville, OK (US); Michael Keane, Owasso, OK (US)

(73) Assignee: Phillips 66 Company, Houston, TX (US)

( * ) Notice: Subject to any disclaimer, the term of this patent is extended or adjusted under 35 U.S.C. 154(b) by 13 days.

(21) Appl. No.: 15/096,901

(22) Filed: Apr. 12, 2016

(65) Prior Publication Data
US 2016/0329576 A1    Nov. 10, 2016

Related U.S. Application Data

(60) Provisional application No. 62/150,932, filed on Apr. 22, 2015.

(51) Int. Cl.
| | |
|---|---|
| *H01M 8/00* | (2016.01) |
| *H01M 8/1226* | (2016.01) |
| *H01M 4/88* | (2006.01) |
| *H01M 4/90* | (2006.01) |
| *H01M 8/124* | (2016.01) |

(52) U.S. Cl.
CPC ....... *H01M 8/1226* (2013.01); *H01M 4/8803* (2013.01); *H01M 4/8846* (2013.01); *H01M 4/9025* (2013.01); *H01M 2008/1293* (2013.01)

(58) Field of Classification Search
CPC ............. H01M 4/8803; H01M 8/1226; H01M 2008/1293; H01M 4/8846; H01M 4/9025; H01M 8/0243; H01M 8/1253
See application file for complete search history.

(56) References Cited

U.S. PATENT DOCUMENTS

| | | | |
|---|---|---|---|
| 2003/0124412 A1* | 7/2003 | Barnett | C04B 35/2633 429/486 |
| 2005/0089740 A1* | 4/2005 | Moon | H01M 4/8621 429/425 |

(Continued)

OTHER PUBLICATIONS

Steven McIntosh and Raymond J. Gorte, "Direct Hydrocarbon Solid Oxide Fuel Cells", Department of Chemical and Biomolecular Engineering, University of Pennsylvania, Chem. Rev. 2004, vol. 104, pp. 4845-4865.

(Continued)

*Primary Examiner* — Cynthia H Kelly
*Assistant Examiner* — Monique M Wills
(74) *Attorney, Agent, or Firm* — Phillips 66 Company

(57) ABSTRACT

A solid oxide fuel cell comprising a cathode, an electrolyte, a functional layer and an anode support. The anode support comprises A-B-C: A is a nitrate, an oxide, a salt or a carbonate selected from the group of: alkali, alkaline oxide, alkaline earth metal or combinations thereof, B is selected from the group of: Fe, Ni, Cu, Co or combinations thereof, and C is selected from the group of: PSZ, YSZ, SSZ, SDC, Ce doped SSZ, GDC or combinations thereof. In the solid oxide fuel cell A ranges from about 0 to about 20 wt % of the anode support, B ranges from about 0.1 to about 70 wt % of the anode support and C ranges from about 0.1 to about 60 wt % of the anode support.

15 Claims, 15 Drawing Sheets

(56) References Cited

U.S. PATENT DOCUMENTS

| | | | |
|---|---|---|---|
| 2009/0047569 A1* | 2/2009 | Jain | H01M 4/8657 |
| | | | 429/470 |
| 2012/0308915 A1* | 12/2012 | Park | H01B 1/122 |
| | | | 429/496 |
| 2013/0171539 A1* | 7/2013 | Lee | H01M 8/1213 |
| | | | 429/482 |

OTHER PUBLICATIONS

Mingfei Liu, YongMan Choi, Lei Yang, Kevin Blinn, Wentao Qin, Ping Liu, Meilin Liu, "Director Octane Fuel Cells: A Promising Power for Transportation", Nano Energy, 2012, vol. 1, pp. 448-455.

R.J. Gorte and J.M. Vohs, "Novel SOFC Anodes for the Direct Electrochemical Oxidation of Hydrocarbons", Department of Chemical Engineers, Jul. 10, 2002, Revised Aug. 5, 2002, accepted Aug. 25, 2002, Journal of Catalysis 216, 2003, pp. 477-486.

Longshan Zhang, Jianfeng Gao, Mingfei, Changrong Xia, "Effect of Impregnation of Sm-Doped CeO2 in NiO/YSZ Anode Substrate Prepared by Gelcasting for Tubular Solid Oxide Fuel Cell", Department of Materials Science and Engineering, Journal of Alloys and Compounds 482, 2009, pp. 168-172.

Manoj R. Pillai, Ilwon Kim, David M. Bierschenk, Scott A. Barnett, "Fuel-Flexible Operation of a Solid Oxide Fuel Cell with Sr0.8La0.2 TiO3 Support", Journal of Power Sources 185, 2008, pp. 1086-1093.

Yun-Hui Huang, Ronald I. Dass, Zheng-Liang Xing, John B. Goodenough, "Double Perovskites as Anode Materials for Solid-Oxide Fuel Cells", Apr. 14, 2006, vol. 312, pp. 254-257.

Lei Yang, YongMan Choi, Wentao Qin, Haiyan Chen, Kevin Blinn, Mingfei Liu, Ping Liu, Jianming Bai, Trevor A. Tyson & Meilin Liu, "Promotion of Water-Mediated Carbon Removal by Nanostructured Barium Oxide/Nickel Interfaces in Solid Oxide Fuels Cells", Nature Communications, Oct. 1, 2010, Published Jun. 21, 2011, pp. 1-9.

\* cited by examiner

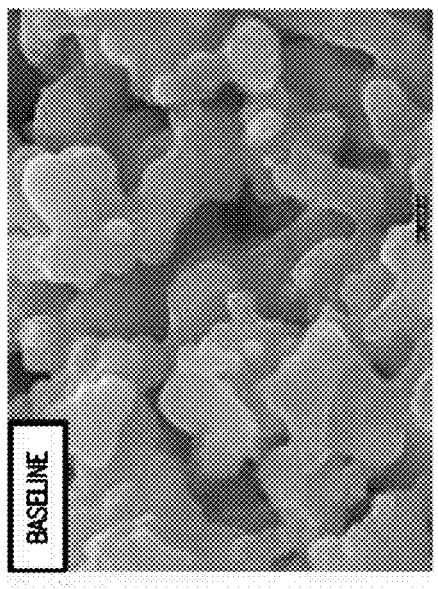
FIG. 2a
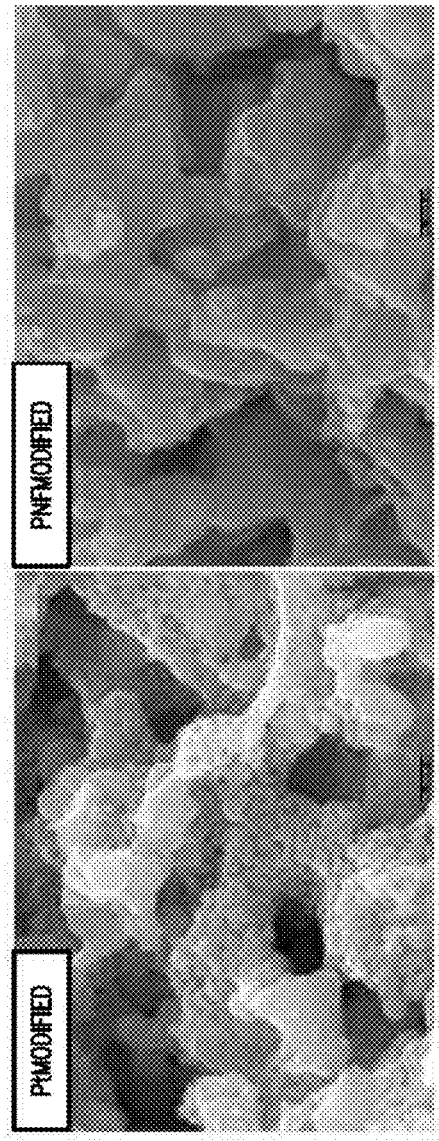
FIG. 2c
FIG. 2b

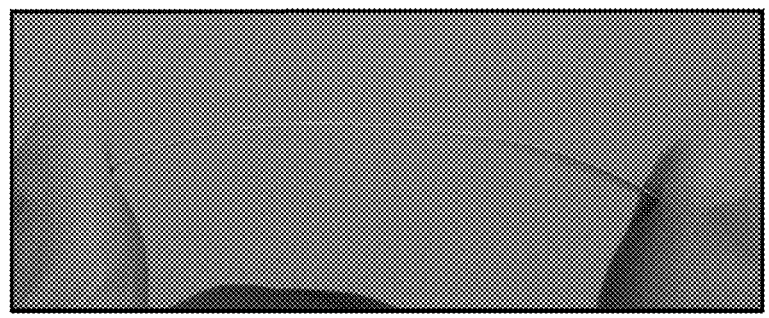
FIG. 7A
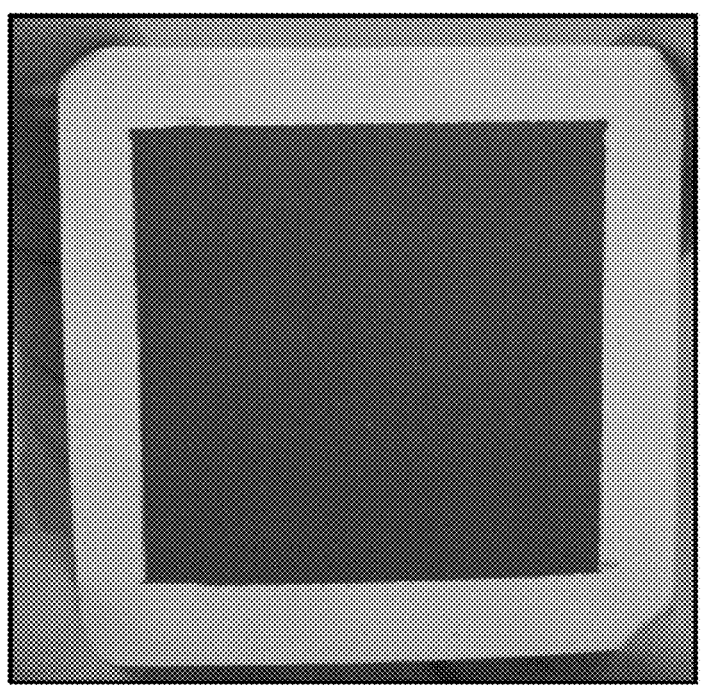
FIG. 7B
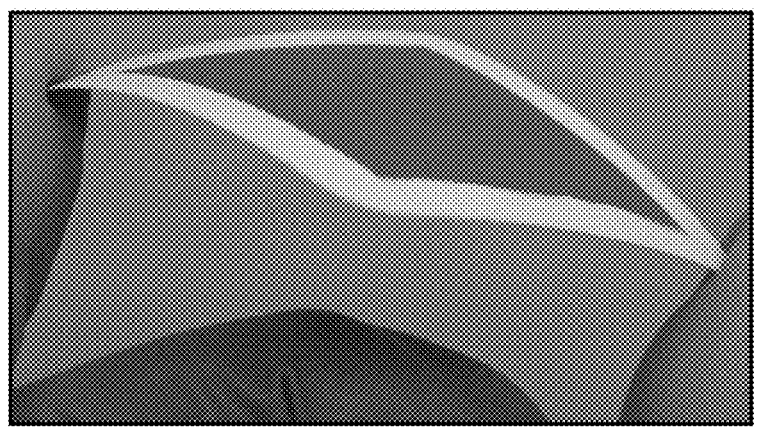
FIG. 7C
*FIG. 7*

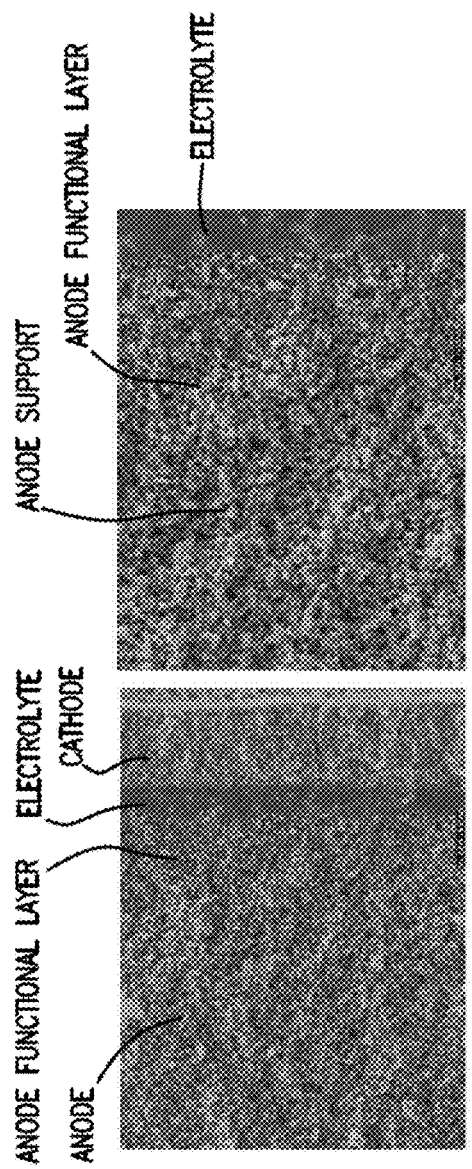
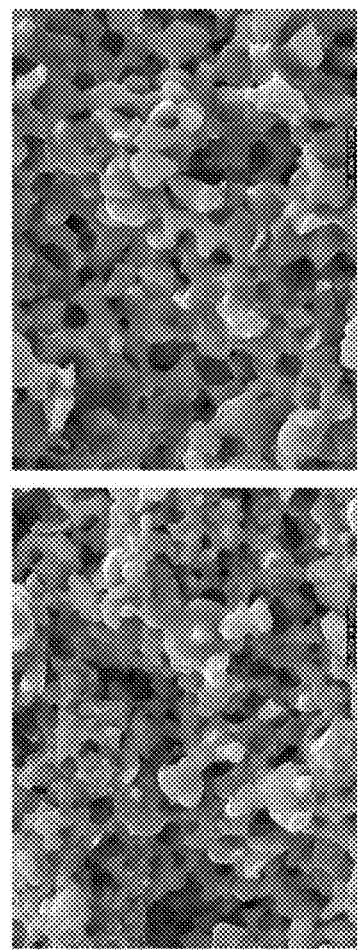
FIG. 11b
FIG. 11d
FIG. 11a
FIG. 11c

MODIFIED SOLID OXIDE FUEL CELL

CROSS-REFERENCE TO RELATED APPLICATIONS

This application is a non-provisional application which claims the benefit of and priority to U.S. Provisional Application Ser. No. 62/150,932 filed Apr. 22, 2015, entitled "Modified Solid Oxide Fuel Cell," which is hereby incorporated by reference in its entirety.

STATEMENT REGARDING FEDERALLY SPONSORED RESEARCH OR DEVELOPMENT

None.

FIELD OF THE INVENTION

This invention relates to a modified solid oxide fuel cell.

BACKGROUND OF THE INVENTION

A solid oxide fuel cell (SOFC) is an electrochemical cell with an anode (fuel electrode) and a cathode (air electrode) separated by a dense ion conducting electrolyte, said cell operating at high temperatures (500-1000° C.). The function of an anode in the solid oxide fuel cell is to react electrochemically with the fuel, which may be hydrogen and hydrocarbons, while the cathode reacts with air or oxygen to produce electric current.

Reviewing a basic operation principle of the SOFC, the SOH: is an apparatus basically generating electricity by the oxidation reaction of hydrogen and carbon monoxide. In the anode layer and the cathode layer, the electrode reaction is performed on the basis of the following reactions.

The basic chemical reactions at the anode side of an SOFC is the oxidation of fuels, such as hydrogen gas and/or carbon monoxide, to generate electrons:

Anode: $H_2 + O^{2-} \rightarrow H_2O + 2e^-$ and/or $CO + O^{2-} \rightarrow CO_2 + 2e^-$ The reaction at the cathode side is the reduction of oxygen to oxygen ions:

Cathode: $O_2 + 4e^- \rightarrow 2O^{2-}$

Therefore, the overall reaction of an SOFC becomes:

Overall: $H_2 + \frac{1}{2}O_2 \rightarrow H_2O$

Or $H_2 + CO + O_2 \rightarrow H_2O + CO_2$

That is, oxygen reaches the electrolyte through the porous cathode layer and the oxygen ion generated by the reduction reaction of oxygen moves to the anode layer through the dense electrolyte layer and again reacts with hydrogen supplied to the porous anode layer, thereby generating water. In this case, electrons are generated in the anode layer and are consumed in the cathode layer. As a result, when two electrodes are connected to each other, electricity flows.

Electricity is generated by the foregoing reaction. In this case, the efficiency of the SOFC is determined, in part, by the electric potential between the anode and cathode.

Researchers have been actively studying SOFC to utilize the fuel cell's potential high energy-generation efficiency. Fuel cells have many potential applications such as supplying power for transportation vehicles, replacing steam turbines and power supply applications of all sorts.

BRIEF SUMMARY OF THE DISCLOSURE

A solid oxide fuel cell comprising a cathode, an electrolyte, a functional layer and an anode support. The anode support comprises A-B-C: A is a nitrate, an oxide, a salt or a carbonate selected from the group of: alkali, alkaline oxide, organometallic, alkaline earth metal or combinations thereof, B is selected from the group of: Fe, Ni, Cu, Co or combinations thereof, and C is selected from the group of: PSZ, YSZ, SSZ, SDC, Ce doped SSZ, GDC or combinations thereof. In the solid oxide fuel cell A ranges from about 0 to about 20 wt % of the anode support, B ranges from about 0.1 to about 70 wt % of the anode support and C ranges from about 0.1 to about 60 wt % of the anode support.

In another embodiment, a solid oxide fuel cell comprises a cathode, an electrolyte, an anode functional layer and an anode support. In this embodiment the cathode is modified with a promoter using liquid or gas phase infiltration. The anode functional layer comprises D-E: D is selected from the group of: Fe, Ni, Cu, Co or combinations thereof, and E is selected from the group of: PSZ, YSZ, SSZ, SDC, Ce doped SSZ, GDC or combinations thereof. The anode support comprises A-B-C: A is a nitrate, an oxide, a salt or a carbonate selected from the group of: alkali, alkaline oxide, organometallic, alkaline earth metal or combinations thereof, B is selected from the group of: Fe, Ni, Cu, Co or combinations thereof, and C is selected from the group of: PSZ, YSZ, SSZ, SDC, Ce doped SSZ, GDC or combinations thereof. In the solid oxide fuel cell A ranges from about 0 to about 20 wt % of the anode support, B ranges from about 0 to about 70 wt % of the anode support and C ranges from about 0.1 to about 60 wt % of the anode support.

In another embodiment, a solid oxide fuel cell comprises a cathode, an electrolyte, an anode functional layer and an anode support. In this embodiment the cathode is modified with a promoter using liquid or gas phase infiltration. The anode functional layer comprises D-E: D is selected from the group of: Fe, Ni, Cu, Co or combinations thereof, and E is selected from the group of: PSZ, YSZ, SSZ, SDC, Ce doped SSZ, GDC or combinations thereof. The anode support comprises A-B-C: A is a nitrate, an oxide, a saltor a carbonate selected from the group of: alkali, alkaline oxide, alkaline earth metal, organometallic, or combinations thereof, B is selected from the group of: Fe, Ni, Cu, Co or combinations thereof, and C is selected from the group of: PSZ, YSZ, SSZ, SDC, Ce doped SSZ, GDC or combinations thereof. In the solid oxide fuel cell A ranges from about 0.05 to about 20 wt % of the anode support, B ranges from about 0.1 to about 70 wt % of the anode support and C ranges from about 0.1 to about 60 wt % of the anode support. In this embodiment A can also be impregnated upon the anode support using liquid or gas phase impregnation.

BRIEF DESCRIPTION OF THE DRAWINGS

A more complete understanding of the present invention and benefits thereof may be acquired by referring to the follow description taken in conjunction with the accompanying drawings in which:

FIGS. 2a, 2b and 2c depict an electron micrograph of modified cathodes.

FIGS. 7a, 7b, and 7c depict images of a solid oxide fuel cell fabricated with an anode support.

FIGS. 11a, 11b, 11c and 11d depict the microstructure of a cell.

DETAILED DESCRIPTION

Figure 1:
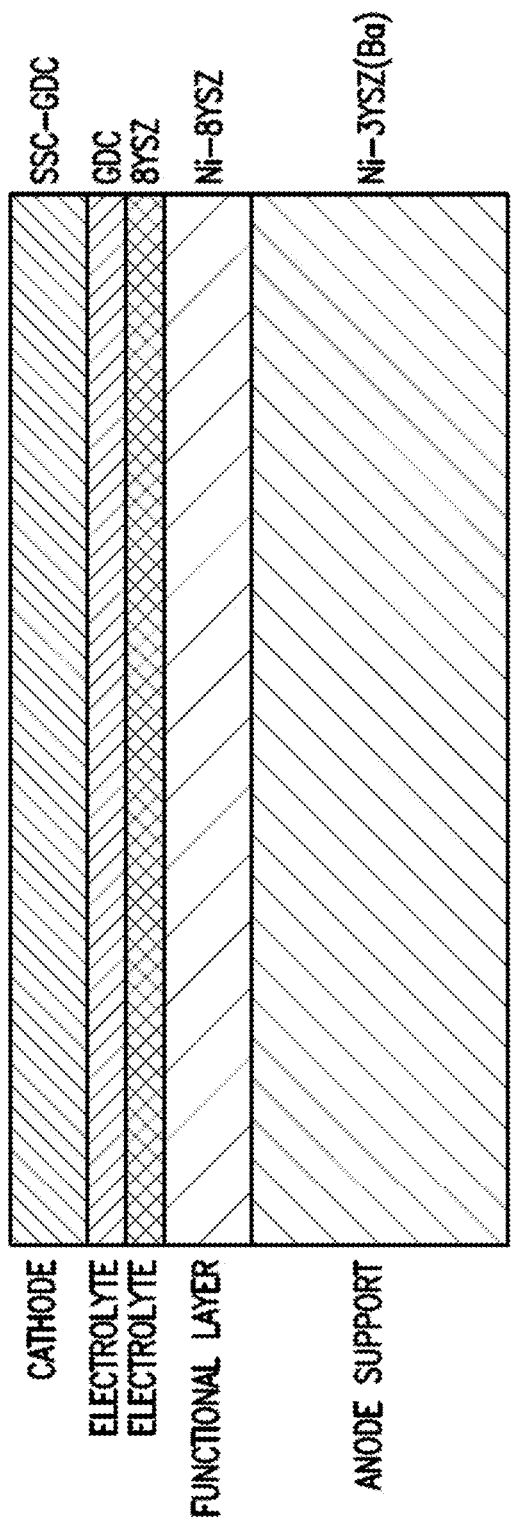
FIG. 1 depicts a representative SOFC.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The present embodiment describes a solid oxide fuel cell comprising a cathode, an electrolyte, a functional layer and an anode support.

Anode Support

The anode support either comprises, consists essentially of, or consists of A-B-C: A can be a nitrate, an oxide, a salt or a carbonate selected from the group of: alkali, alkaline oxide, alkaline earth metal or combinations thereof. While not being limited examples of A can include: $BaCO_3$, $CaCO_3$, $SrCO_3$, $Li_2CO_3$, $K_2CO_3$, BaO, CaO, SrO, $Na_2CO_3$, $Ba(NO_3)_2$, $Ca(NO_3)_2$, $Sr(NO_3)_2$, $LiNO_3$, $NaNO_3$, $KNO_3$, MgO, $Mg(NO_3)_2$ or combinations thereof. In this embodiment, the weight percent of A can range from about 0 to about 20 wt % of the anode support. In other embodiments it is possible that A can range anywhere from about 0.05 to about 20 wt %, about 0.1 to about 20 wt %, about 0.1 to about 15 wt %, about 1 to about 15 wt %, even about 1 to about 10 wt %.

B can be selected from the group of: Fe, Ni, Cu, Co or combinations thereof. In this embodiment, the weight percent of B can range from about 0 to about 70 wt % of the anode support. In other embodiments it is possible that B can range anywhere from about 0.1 to about 70 wt %, about 10 to about 65 wt %, about 15 to about 65 wt %, about 20 to about 65 wt %, about 30 to about 60 wt %, even about 35 to about 60 wt %.

C can be selected from the group of: partially stabilized zirconia or 2-4 mole % yttria stabilized zirconia (PSZ), yittria stabilized zirconia or 5-10 mole % yttria stabilized zirconia (YSZ), scandia stabilized zirconia (SSZ), samarium doped ceria (SDC), Ce doped SSZ, gadolinium doped ceria (GDC) or combinations thereof. In this embodiment, the weight percent of B can range from about 0.1 to about 60 wt % of the anode support. In other embodiments it is possible that B can range anywhere from about 1 to about 60 wt %, about 10 to about 60 wt %, about 20 to about 55 wt %, about 25 to about 50 wt %, even about 25 to about 45 wt %.

Formation of the anode support is done by any conventionally known method to produce anode supports. Examples of these methods include tape casting or gel-casting or extrusion of a slip into an anode support, upon which the functional layer and electrolyte are applied by film deposition process such as screen printing or spray coating or 3-D printing, or dip-coating. The anode support, functional layer, and electrolyte are then sintered at high temperatures to densify the electrolyte. In one embodiment, the addition of component A into the anode support is done without any modification of a conventional tape casting and sintering process. In yet another embodiment, the addition of component A into the anode support is done via liquid or gas phase impregnation, after the conventional sintering process.

Different types of liquid phase infiltration can be utilized. In one embodiment the liquid phase infiltration involves capillary forces. Examples of different liquid phase infiltration techniques include ultrasonic spray coating, painting, spraying, or dip coating.

Functional Layer

The functional layer can be an anode functional layer. In one embodiment the functional layer can comprise, consists essentially of, or consists of D-E. In this embodiment D can be selected Fe, Ni, Cu, Co or combinations thereof. Additionally, in this embodiment, E can be selected from the group of PSZ, YSZ, SSZ, SDC, Ce doped SSZ, GDC or combinations thereof.

Although the selection of the functional layer can be for a variety of reasons, one such theorized reason for the functional layer is to protect any interface reaction or interdiffusion between the electrolyte and the anode support should any component in the anode support be reactive with the electrolyte. It is possible that the functional layer completely blocks any interface reaction or interdiffusion between the electrolyte and the anode support. The functional layer also has catalytic activity for fuel oxidation.

In one embodiment the selection of component D and component B are identical. In yet another embodiment the selection of component D and component B are different.

In one embodiment the selection of component E and component C are identical. In yet another embodiment the selection of component E and component C are different.

Electrolyte

In the current SOFC the electrolyte can be any electrolyte known to those skilled in the art. Examples of electrolytes include: PSZ, YSZ, SSZ, SDC, GDC, Barium-Zirconium-Cerium-Yttrium-Ytterbium Oxide (BZCYYb) or combinations thereof.

Cathode

In one embodiment of the SOFC the cathode is typically porous to allow the oxygen reduction to occur. Any cathode material known to those skilled in the art can be used. One example of cathode materials that are typically used include perovskite-type oxides with a general formula of $ABO_3$. In this embodiment the A cations are typically rare earths doped with alkaline earth metals including La, Sr, Ca, Pr or Ba. The B cations can be metals such as Ti, Cr, Ni, Fe, Co, Cu or Mn. Examples of these perovskite-type oxides include $LaMnO_3$. In one differing embodiment the perovskite can be doped with a group 2 element such as $Sr^{2+}$ or $Ca^{2+}$. In another embodiment cathodes such as $Pr_{0.5}Sr_{0.5}FeO_3$; $Sr_{0.9}Ce_{0.1}Fe_{0.8}Ni_{0.2}O_3$; $Sr_{0.8}Ce_{0.1}Fe_{0.7}Co_{0.3}O_3$; $LaNi_{0.6}Fe_{0.4}O_3$; $Pr_{0.8}Sr_{0.2}Co_{0.2}Fe_{0.8}O_3$; $Pr_{0.7}Sr_{0.3}CO_{0.2}Mn_{0.8}O_3$; $Pr_{0.8}Sr_{0.2}FeO_3$; $Pr_{0.6}Sr_{0.4}Co_{0.8}Fe_{0.2}O_3$; $Pr_{0.4}Sr_{0.6}Co_{0.8}Fe_{0.2}O_3$; $Pr_{0.7}Sr_{0.3}Co_{0.9}Cu_{0.1}O_3$; $Ba_{0.5}Sr_{0.5}Co_{0.8}Fe_{0.2}O_3$; $Sm_{0.5}Sr_{0.5}CoO_3$ (SSC); or $LaNi_{0.6}Fe_{0.4}O_3$ can be utilized. Other materials that the cathode could be include lanthanum strontium iron cobalt oxide, doped ceria, strontium samarium cobalt oxide, lanthanum strontium iron oxide, lanthanum strontium cobalt oxide, barium strontium cobalt iron oxide, PSZ, YSZ, SSZ, SDC, Ce doped SSZ, GDC or combinations thereof.

In one embodiment the cathode has been modified with a promoter using either liquid or gas phase infiltration. Different types of liquid phase infiltration can be utilized. Examples of different liquid phase infiltration techniques include ultrasonic spray coating, painting, spraying, or dip coating.

In one embodiment the infiltration of the cathode is done with a promoter selected from the group consisting of: Pr, Nd, Cu, Mn, Sr, Ce, Fe, Co, La, Sm, Ni, Gd, Ca, Ba, Bi, Ga, Mg, Pt, Ag, Ru or combinations thereof. In yet another embodiment, the promoter can be an oxide, hydroxide, carbonate, organometallic, or metal organic of: Pr, Nd, Cu, Mn, Sr, Ce, Fe, Co, La, Sm, Ni, Gd, Ca, Ba, Bi, Ga, Mg, Pt, Ag, Ru or combinations thereof. In one example the promoters are selected from Pr—Ni—Fe, Nd—La—Mn—Ni, Pr—Mn—Ni, Pr—Ba—Co—Fe, Pr—Ni, gadolinium doped ceria or combinations thereof.

During this liquid phase infiltration the promoter layer can be added to the cathode in a thickness from about 1nm to 100 nm or even 1000 nm both on the surface and the interior of the cathode. In one embodiment the thickness of the infiltration is less than 100 nm. The weight percent of the promoter layer on the cathode can range from less than 50 wt %, less than 40 wt %, less than 30 wt %, less than 20 wt %, less than 10 wt %, less than 5 wt % or even less than 1 wt % of the cathode. Alternatively described the weight percent of the promoter layer on the cathode can range from about 0.01 to 5 wt %, 0.01 to 10 wt %, 0.01 to 40 wt % even 0.01 to 50 wt % of the cathode.

Formation of SOFC

As shown in FIG. 1, a representative SOFC is shown with an electrolyte layer and a functional layer disposed between a cathode and an anode support.

Operating Conditions

The SOFC can operate under any conventionally known fuel and at any conventionally known operating temperature. Non-limiting examples of fuel that the SOFC can operate in include hydrogen fuel, methane fuel or natural gas. Non-limiting examples of the temperatures in which the SOFC can operate in include temperatures less than 900° C., 850° C., 800° C., 750° C., 700° C., 650° C., 600° C., 550° C. or even 500° C. Described differently, the temperatures in which the SOFC could operate can range from 500° C. to 900° C. or even 550° C. to about 850° C.

The following examples of certain embodiments of the invention are given. Each example is provided by way of explanation of the invention, one of many embodiments of the invention, and the following examples should not be read to limit, or define, the scope of the invention.

Example 1

A cell was constructed comprising a Ni-YSZ anode support, a Ni-YSZ functional layer, a YSZ electrolyte, a second GDC electrolyte, and a SSC-GDC cathode layer. Five different cathode infiltrations were investigated, GDC, SSC, Pr(Ni,Fe)O₃, Pt and Pd.

To assist in the infiltrations of the promoters organic solvents with low surface tension, such as ethanol (22.3 mN/m at 25° C.), acetone (23.7 mN/m at 25° C.), and IPA (21.7 mN/m at 25° C.) were utilized. The mixture of water and organic solvents provided optimal uniform catalyst coatings.

FIG. 2 depicts scanning electron micrographs of a base SSC-GDC cathode (FIG. 2a), a Pt modified SSC-GDC cathode (FIG. 2b) and a Pr(Ni,Fe)O₃ modified SSC-GDC cathode (FIG. 2c).

Figure 3:
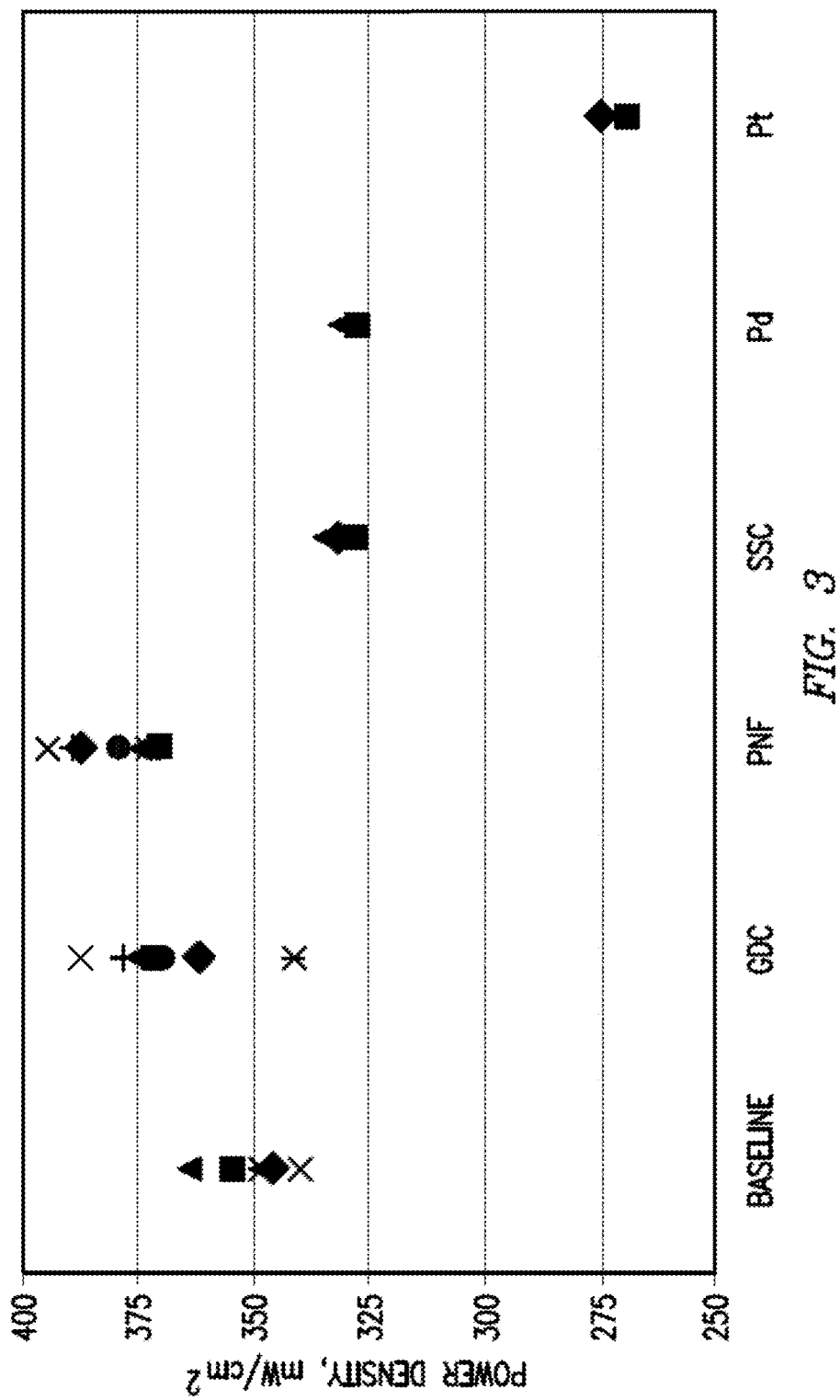
FIG. 3 depicts the power densities of modified SOFCs.

FIG. 3 shows the distribution of power densities from the cells (operated at 0.8 V and a temperature of 650° C. when using wet hydrogen as fuel) as a function of the 5 catalysts modification. A summary of the cell performance and standard deviations in the data was given in Table I.

TABLE 1

| Cathode modification | Average Power Density mW/cm² | cells |
|---|---|---|
| Baseline | 347 ± 5 | 5 |
| GDC | 371 ± 15 | 8 |
| PNF | 381 ± 9 | 7 |
| SSC | 332 ± 3 | 3 |
| Pd | 329 ± 1 | 3 |
| Pt | 272 ± 4 | 2 |

Figure 4:
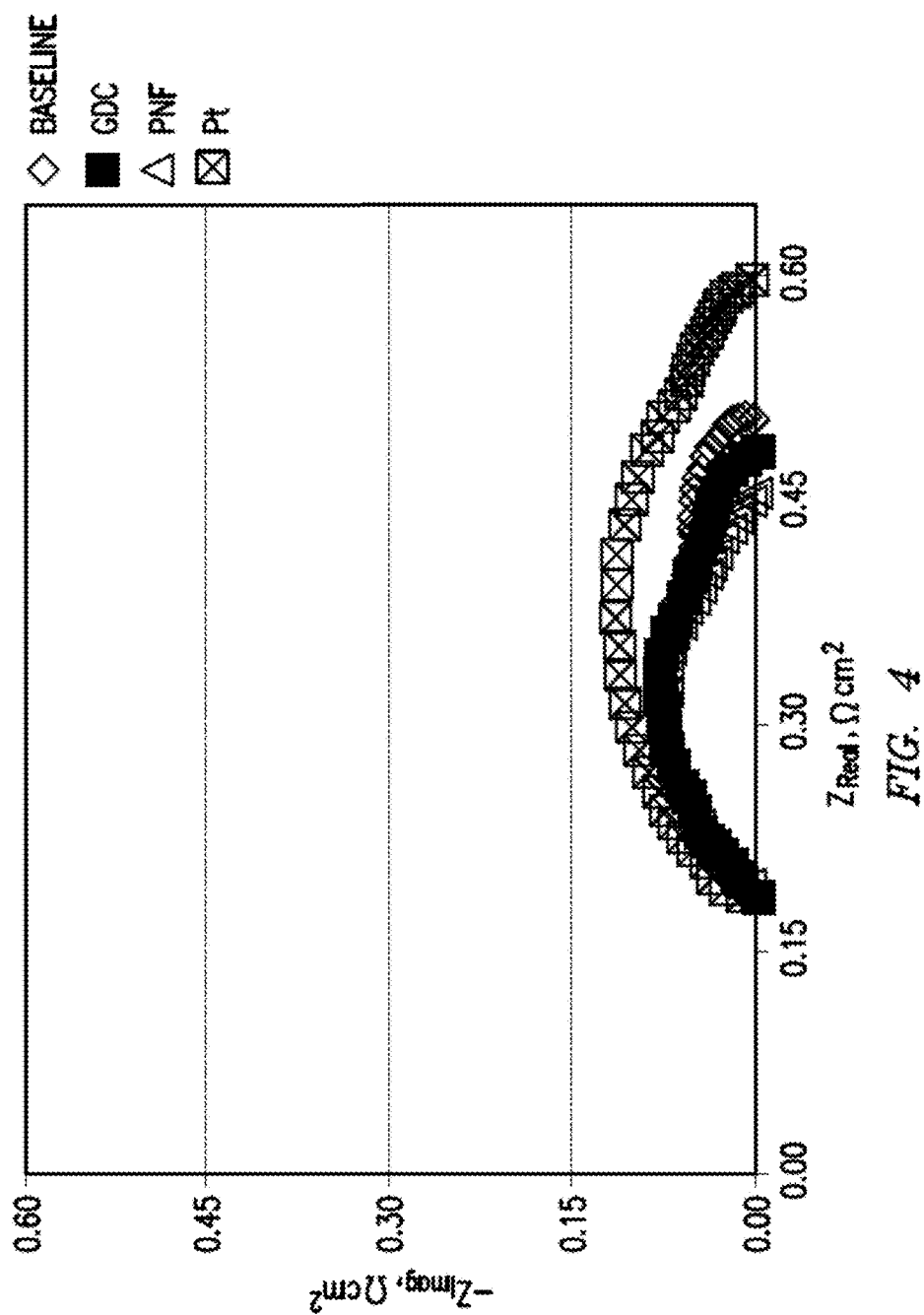
FIG. 4 depicts the impedance spectra of modified SOFCs.

FIG. 4 shows the typical impedance spectra of the cells obtained under an operating voltage of 0.8 V. For comparison, the baseline cell and Pt infiltrated cell were also plotted in FIG. 4. In the spectra, the intercept of the semicircle to the real axis at high frequency relates to the cell ohmic resistance (Ro), and the intercept at low frequency represents the total resistances of the cell, while the difference between the two values corresponds to the sum of the polarization resistances (Rp). Rp usually arises from activation energy required for the electrochemical reactions at the electrodes, mainly from electrode-electrolyte interfaces.

Figure 5:
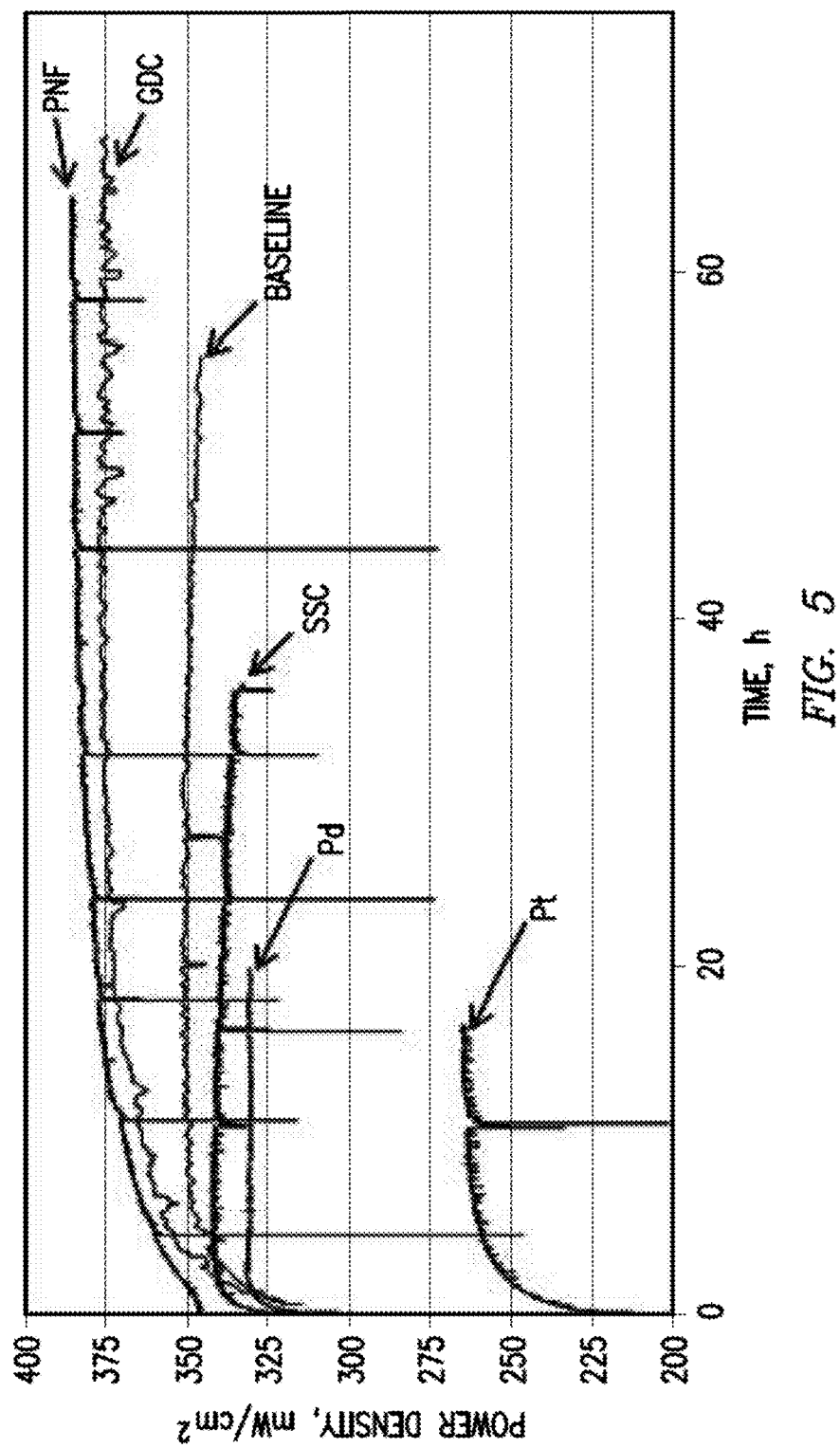
FIG. 5 depicts the power density over time of modified SOFCs.

FIG. 5 shows power density over time for some of the cells (data of longest testing time for each condition).

Example 2

A cell was constructed comprising a Ni-PSZ anode support, a Ni-YSZ functional layer, a YSZ electrolyte, a GDC electrolyte buffer layer and a SSC-GDC cathode layer. PSZ was used in the anode support to improve the anode support mechanical strength. YSZ was used in the functional layer to improve oxygen ion conductivity in the functional layer and prevent a reaction between the PSZ in the anode support and YSZ in the anode functional layer.

Figure 6:
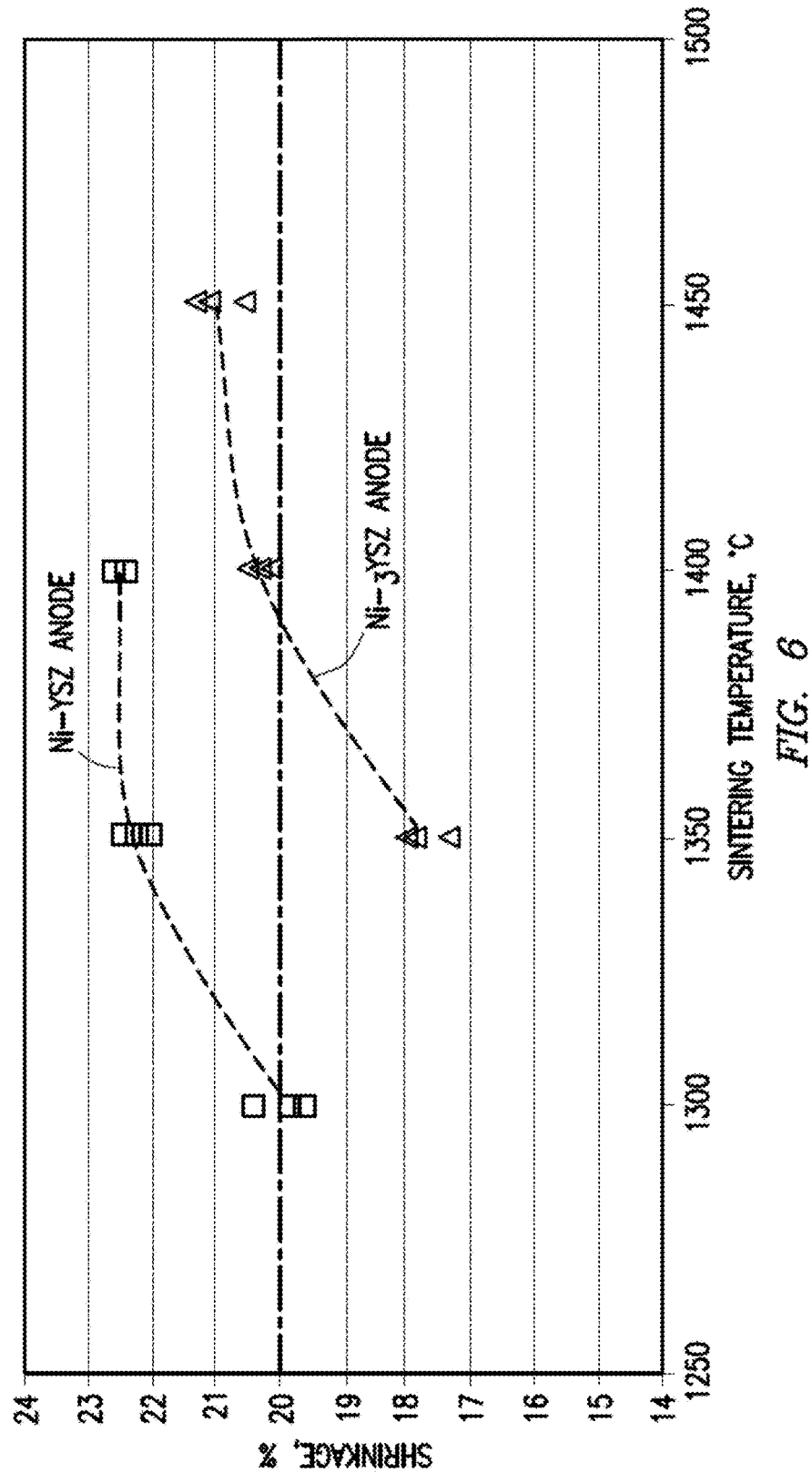
FIG. 6 depicts the sinterability of an anode support.

FIG. 6 shows the sinterability of the anode support with Ni-PSZ, showing it can be processed similar to anode supports containing Ni-YSZ.

FIG. 7 shows an image of a cell with a Ni-PSZ anode support showing the strength and toughness that the PSZ imparts on the cell such that it can be deformed greatly without breaking. FIGS. 7a and 7c are deformed and FIG. 7b is an image.

Figure 8:
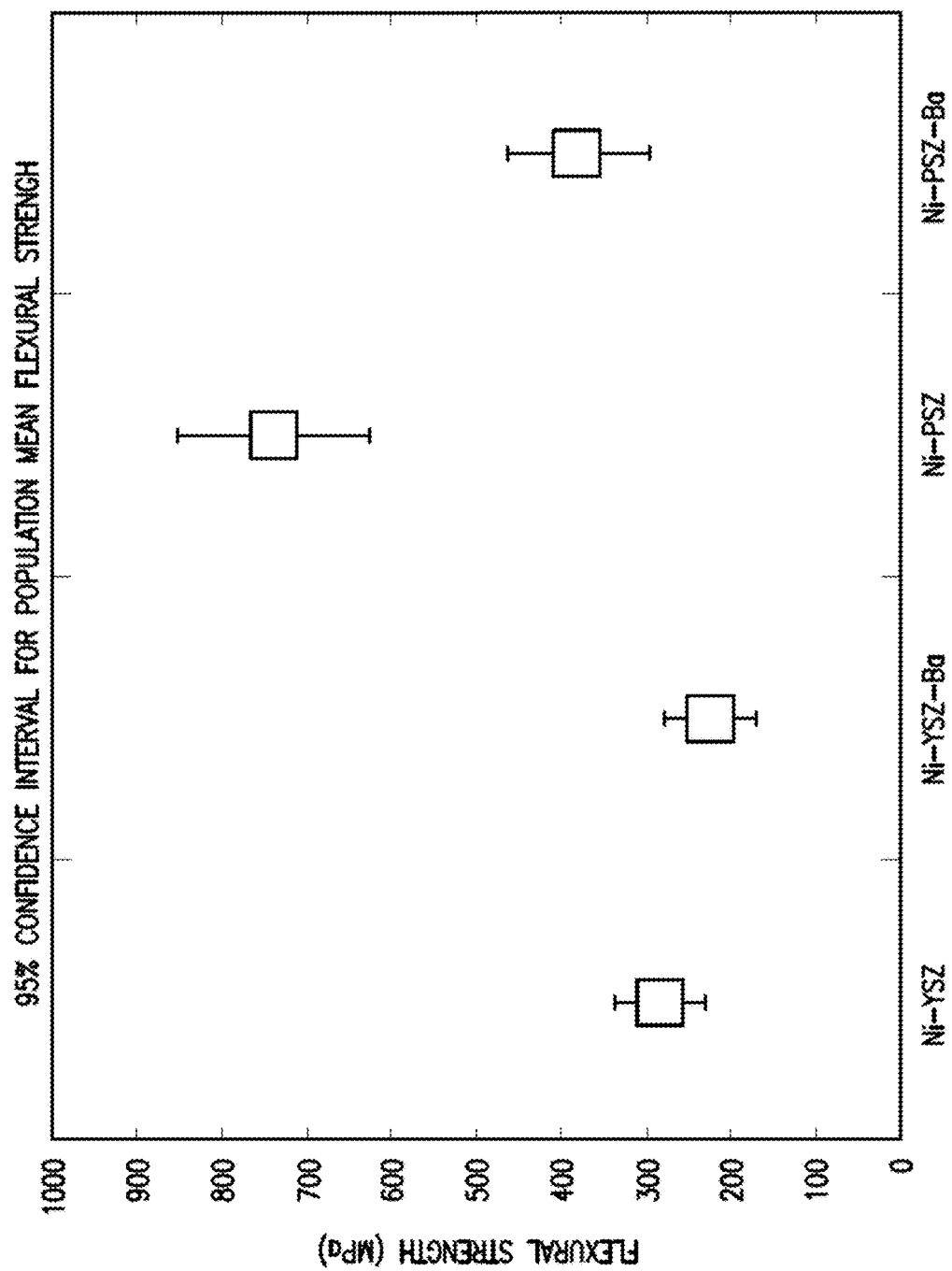
FIG. 8 depicts the mechanical strength of a solid oxide fuel cell fabricated with an anode support.

FIG. 8 depicts the mechanical strength of a cell with a Ni-PSZ anode support performed in a biaxial strength test that shows an enhanced strength over a cell with a Ni-YSZ anode support.

Figure 9:
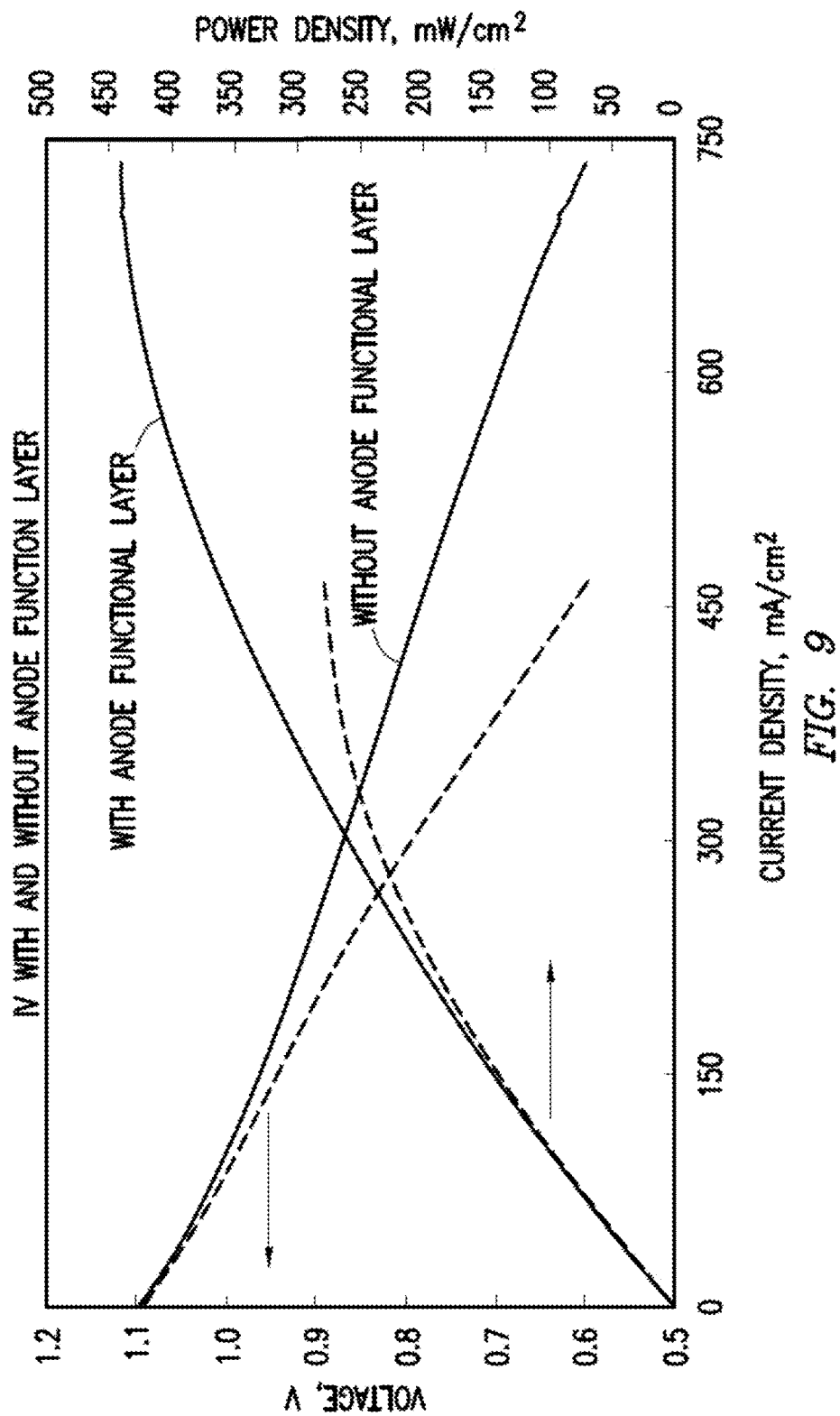
FIG. 9 depicts the performance of a solid oxide fuel cell.

FIG. 9 depicts the power density of a cell with a Ni-PSZ anode support with and without a YSZ functional layer.

Figure 10:
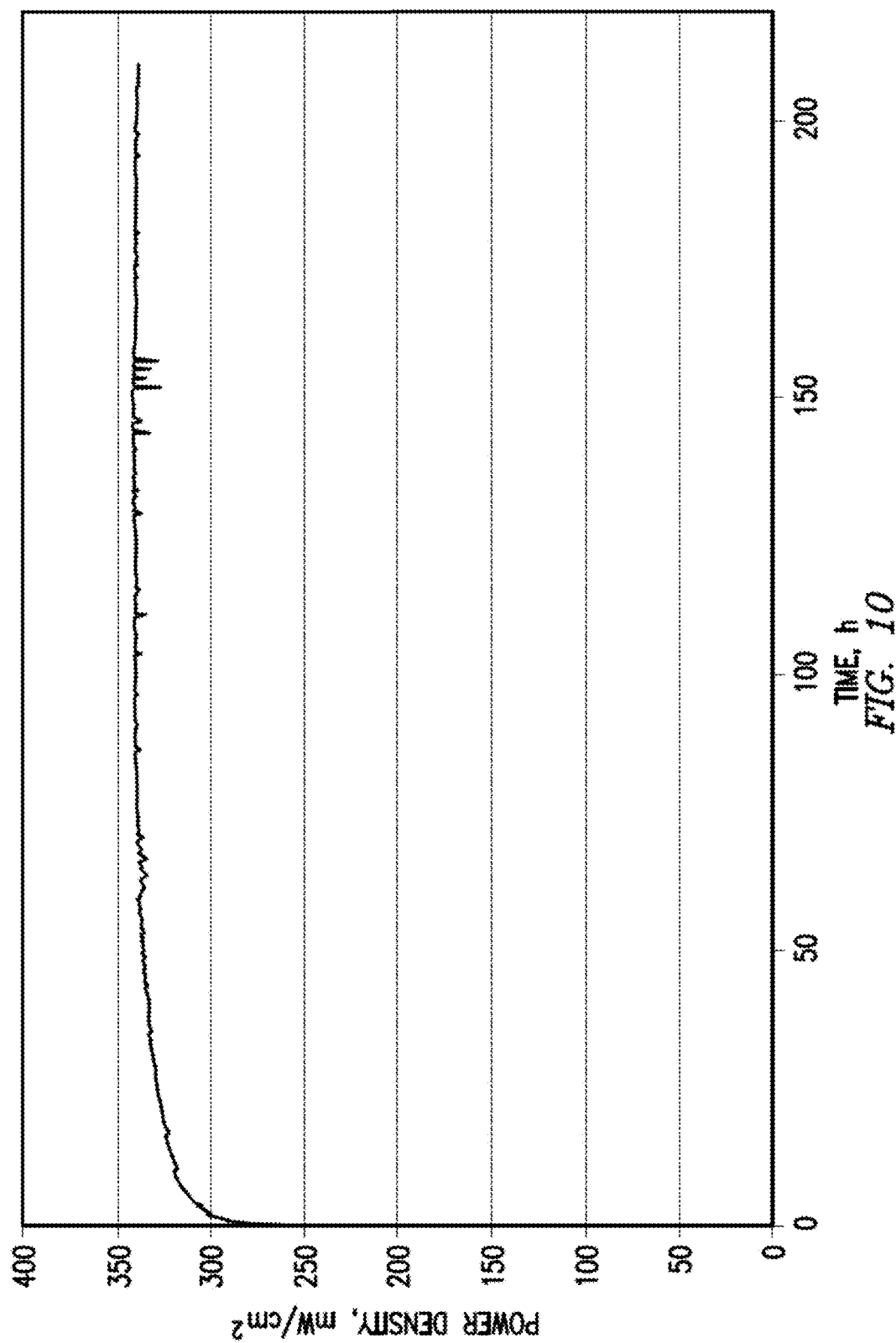
FIG. 10 depicts the power density versus time for a cell.

FIG. 10 depicts the power density versus time for a cell where B and D are both Ni, C is PSZ, and E is YSZ.

FIGS. 11a, 11b, 11c and 11c depict the microstructure of a cell with a Ni-PSZ anode support and a Ni-YSZ electrolyte, where B and D are both Ni, C is PSZ and E is YSZ.

Figure 12:
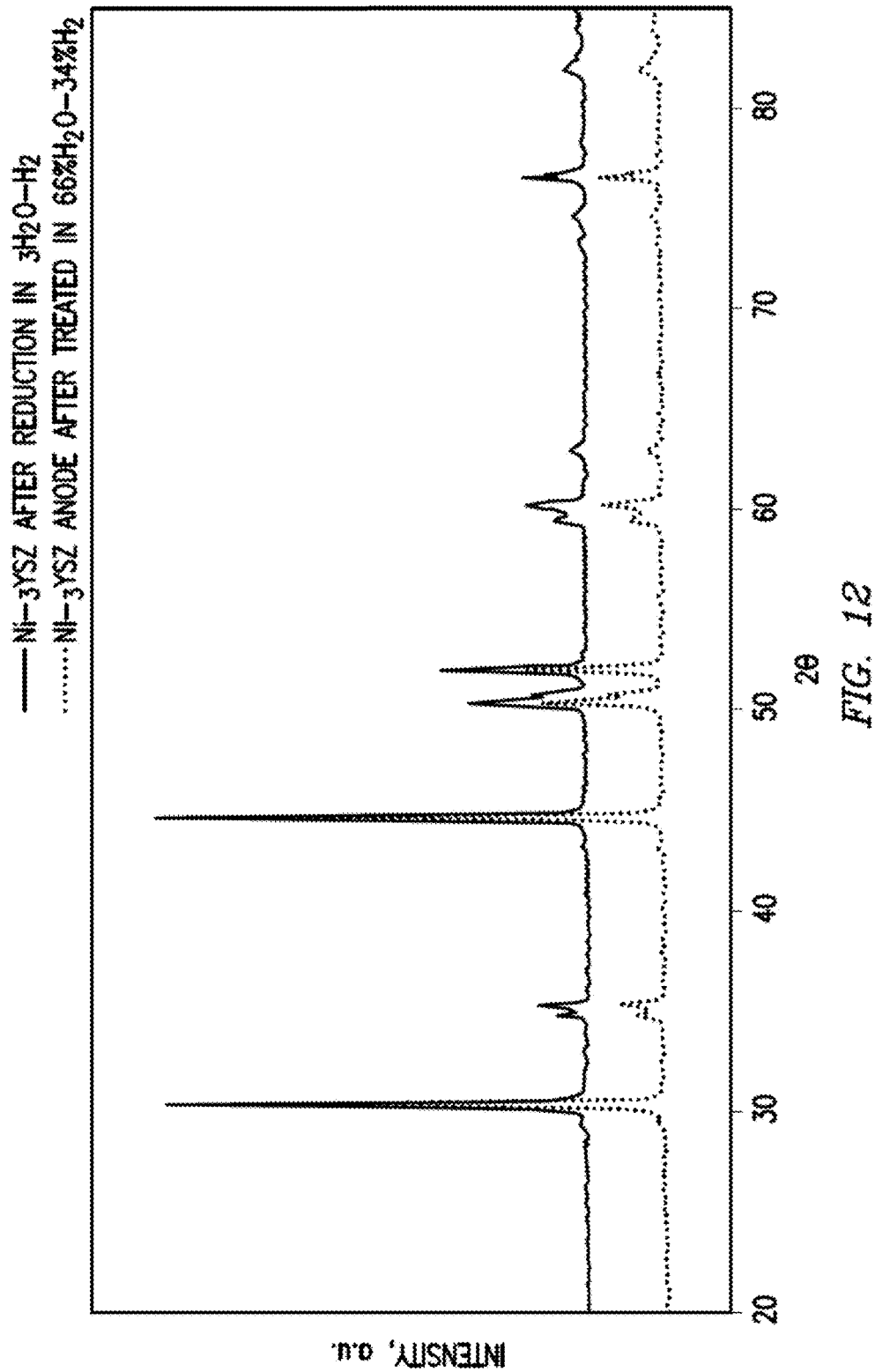
FIG. 12 depicts the phase stability of an anode support.

FIG. 12 depicts the phase stability of the Ni-PSZ anode support, where B is Ni and C is PSZ, after exposure to a fuel with a high humidity. There was no detectable phase change after 720 h treatment in 66.7% $H_2O$+33.3% $H_2$ at 650° C.

Example 3

A cell was constructed comprising a Ni-PSZ anode support, a Ni-YSZ functional layer, a YSZ electrolyte, a GDC electrolyte buffer layer and a SSC-GDC cathode layer where the cathode has been impregnated with liquid phase infiltration of Pr(Ni,Fe)O$_3$.

Figure 13:
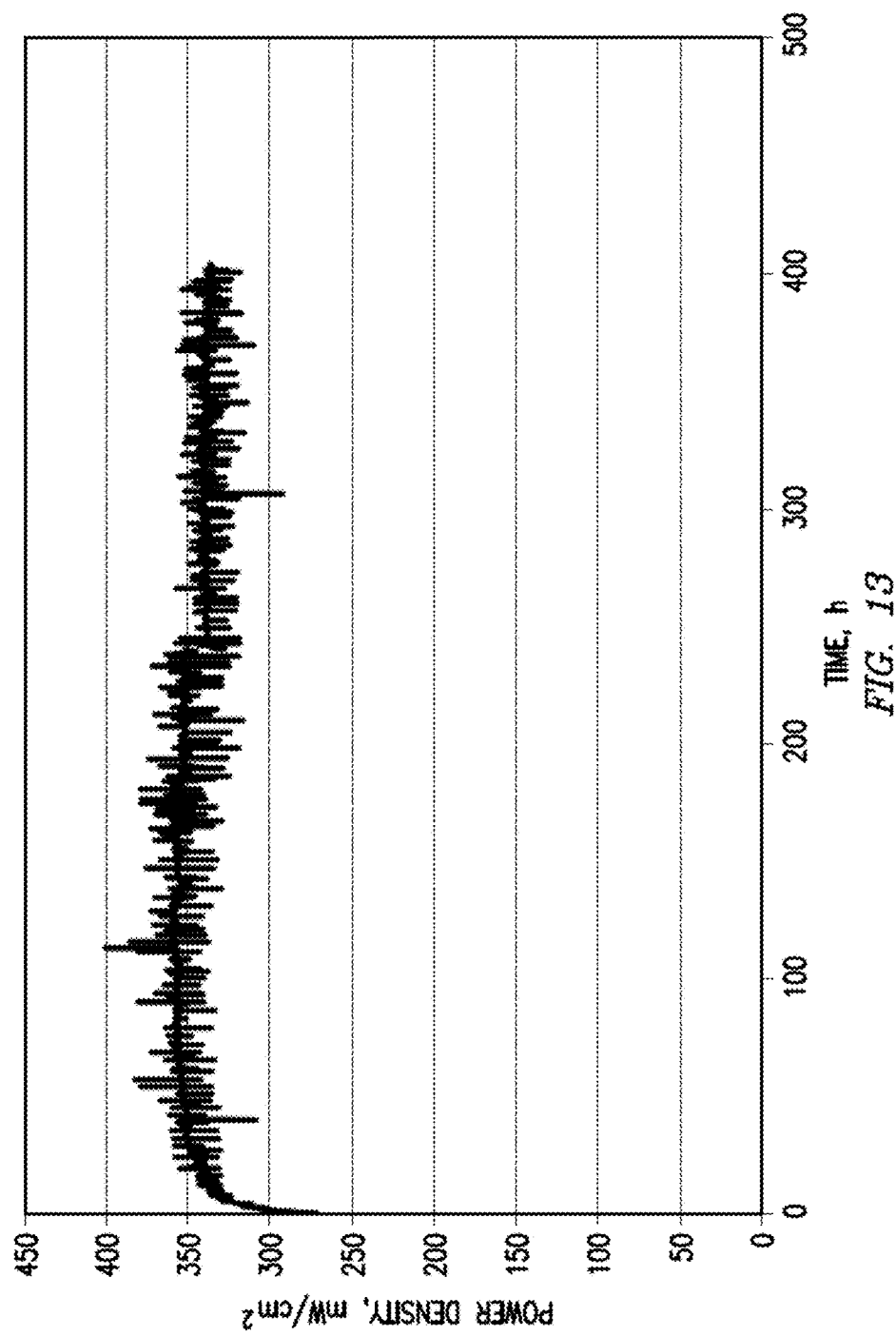
FIG. 13 depicts the power density versus time for a cell.

FIG. 13 shows the power density versus time for the solid oxide fuel cell in hydrogen fuel. In this figure B and D are both Ni, C is PSZ and E is YSZ. The cathode, which is a composite of (Sr$_{0.5}$Sm$_{0.5}$)CoO$_3$ and Gd doped ceria, has been modified by liquid phase infiltration with a mixture of Pr, Ni, and Fe.

Example 4

A cell was constructed comprising a Ba-Ni-PSZ anode support, a Ni-YSZ functional layer, a YSZ electrolyte, a GDC electrolyte buffer layer and a SSC-GDC cathode layer. PSZ was used in the anode support to improve the anode support mechanical strength while Ba was used in the anode support to prevent coking and sulfur poisoning during operation on fuels such as natural gas, methane, or propane. YSZ was used in the functional layer to improve oxygen ion conductivity in the functional layer and prevent a reaction between the PSZ and Ba in the anode support and YSZ in the anode functional layer.

Figure 14:
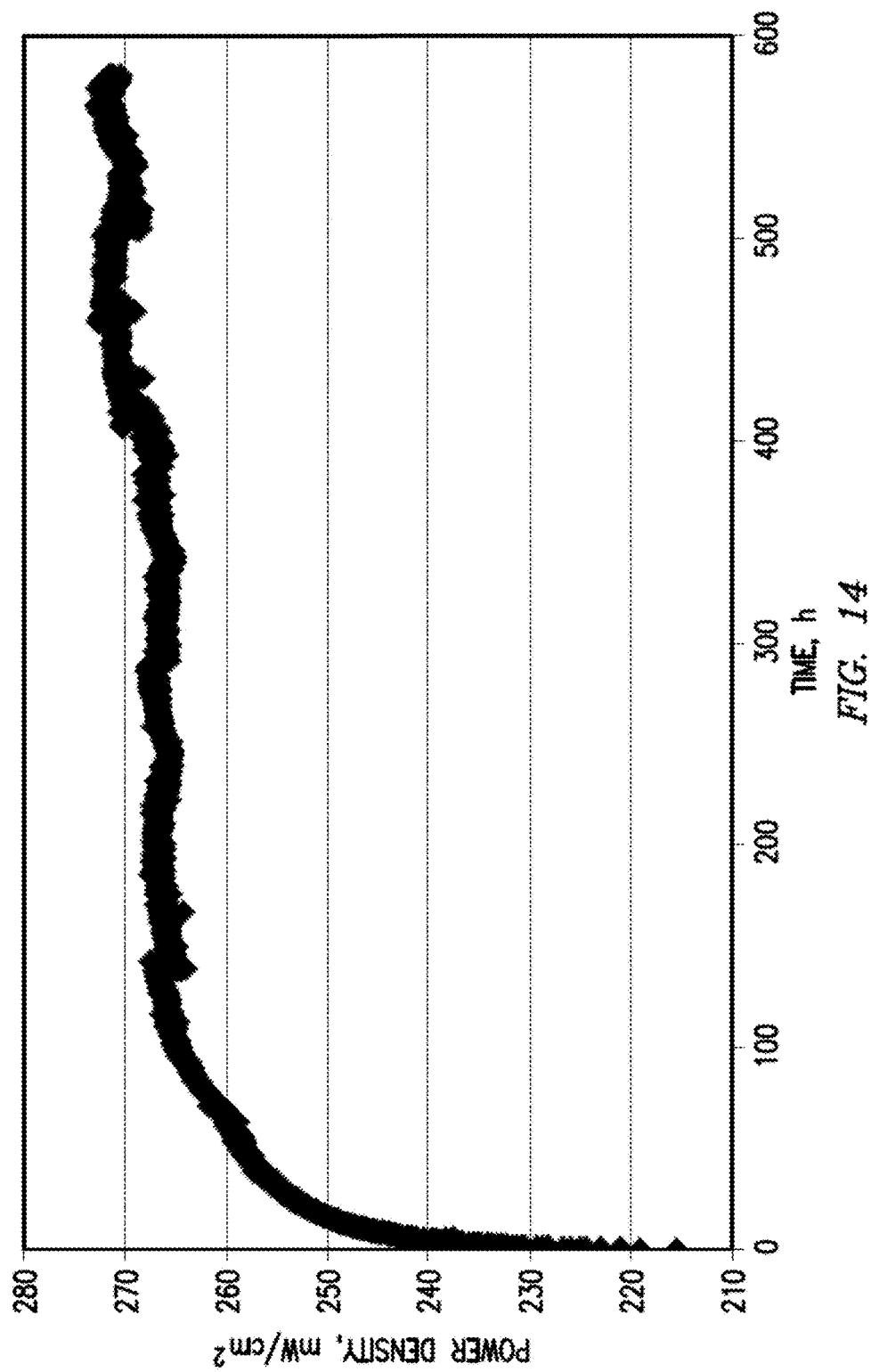
FIG. 14 depicts the power density versus time for a cell.

FIG. 14 shows the power density of the cell, where A is Ba, B is Ni, C is PSZ, D is Ni and E is YSZ versus time while operating on hydrogen fuel at 650° C.

Figure 15:
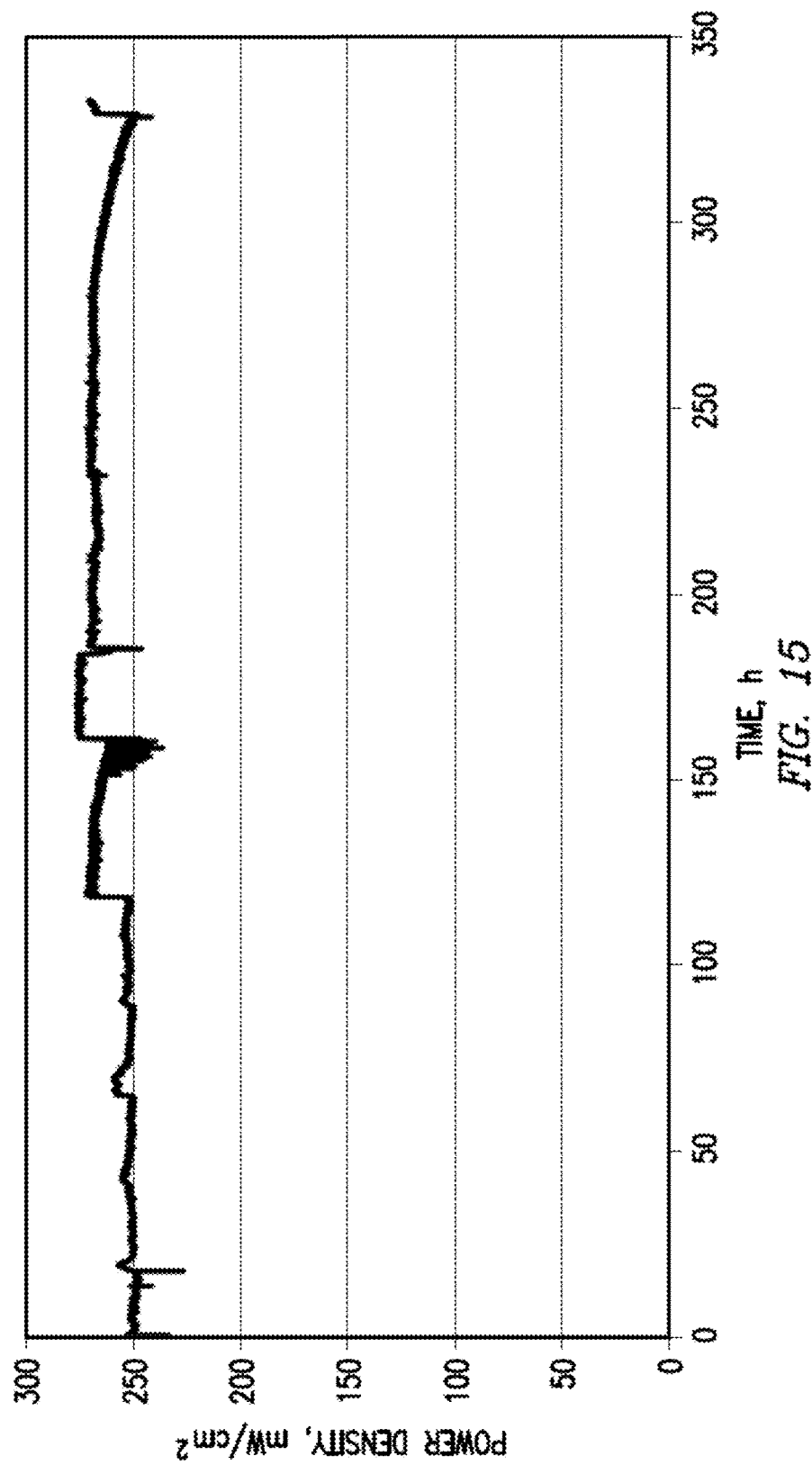
FIG. 15 depicts the power density versus time for a cell.

FIG. 15 shows the power density of the cell, where A is Ba, B is Ni, C is PSZ, D is Ni and E is YSZ versus time while operating on methane fuel at 650° C.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A solid oxide fuel cell, comprising:
a cathode;
an electrolyte;
a functional layer and;
an anode support comprising A-B-C: A is selected from the group of: BaCO$_3$, CaCO$_3$, SrCO$_3$, Li$_2$CO$_3$, K$_2$CO$_3$, Na$_2$CO$_3$, Ba(NO$_3$)$_2$, Ca(NO$_3$)$_2$, Sr(NO$_3$)$_2$, LiNO$_3$, NaNO$_3$, KNO$_3$, MgO, Mg(NO$_3$)$_2$, or combinations thereof, B is selected from the group of: Fe, Cu, Co or combinations thereof, and C is selected from the group of: PSZ, SSZ, SDC, Ce doped SSZ, GDC or combinations thereof,
wherein A ranges from about 0 to about 20 wt %, B ranges from about 0.1 to about 70 wt % and C ranges from about 0.1 to about 60 wt % of the anode support and wherein the cathode has been modified with a promoter using liquid or gas phase infiltration wherein the promoter is Pr—Ni—Fe.

2. The solid oxide fuel cell of claim 1, wherein A is between 0.05 to 15 wt % of the anode support.

3. The solid oxide fuel cell of claim 1, wherein B is between 15 to 65 wt % of the anode support.

4. The solid oxide fuel cell of claim 1, wherein C is between 20 to 55 wt % of the anode support.

5. The solid oxide fuel cell of claim 1, wherein the functional layer is an anode functional layer.

6. The solid oxide fuel cell of claim 1, wherein the functional layer comprising D-E: D is selected from the group of: Fe, Ni, Cu, Co or combinations thereof, and E is selected from the group of: PSZ, YSZ, SSZ, SDC, Ce doped SSZ, GDC or combinations thereof.

7. The solid oxide fuel cell of claim 6, wherein D and B are identical.

8. The solid oxide fuel cell of claim 6, wherein E and C are identical.

9. The solid oxide fuel cell of claim 6, wherein E and C are different.

10. The solid oxide fuel cell of claim 1, wherein A is impregnated upon the anode support using liquid or gas phase impregnation.

11. The solid oxide fuel cell of claim 1, wherein the promoter is an oxide, hydroxide, carbonate, metal organic, organometallic, or combinations thereof.

12. A solid oxide fuel cell,
comprising:
a cathode modified with a promoter using liquid or gas phase infiltration;
an electrolyte;
an anode functional layer comprising D-E: D is selected from the group of: Fe, Ni, Cu, Co or combinations thereof, and E is selected from the group of: PSZ, YSZ, SSZ, SDC, Ce doped SSZ, GDC or combinations thereof,
an anode support comprising A-B-C: A is selected from the group of: BaCO$_3$, CaCO$_3$, SrCO$_3$, Li$_2$CO$_3$, K$_2$CO$_3$, Na$_2$CO$_3$, Ba(NO$_3$)$_2$, Ca(NO$_3$)$_2$, Sr(NO$_3$)$_2$, LiNO$_3$, NaNO$_3$, KNO$_3$, MgO, Mg(NO$_3$)$_2$, or combinations thereof, B is selected from the group of: Fe, Cu, Co or combinations thereof, and C is selected from the group of: PSZ, SSZ, SDC, Ce doped SSZ, GDC or combinations thereof,
wherein A ranges from about 0 to about 20 wt %, B ranges from about 0.1 to about 70 wt % and C ranges from about 0.1 to about 60 wt % of the anode support and wherein the cathode has been modified with a promoter using liquid or gas phase infiltration wherein the promoter is Pr—Ni—Fe.

13. The solid oxide fuel cell of claim 12, wherein the cathode is infiltrated with a promoter selected from the group consisting of: Pr, Nd, Cu, Mn, Sr, Ce, Fe, Co, La, Sm, Ni, Gd, Ca, Ba, Bi, Ga, Mg, Pt, Ag, Ru or combinations thereof.

14. The solid oxide fuel cell of claim 12, wherein promoter is an oxide, hydroxide, carbonate, metal organic or combinations thereof.

15. A solid oxide fuel cell, comprising:
a cathode modified with a promoter using liquid or gas phase infiltration;
an electrolyte;
an anode functional layer comprising D-E: D is selected from the group of: Fe, Ni, Cu, Co or combinations thereof, and E is selected from the group of: PSZ, YSZ, SSZ, SDC, Ce doped SSZ, GDC or combinations thereof, an anode support comprising A-B-C: A is selected from the group of: $BaCO_3$, $CaCO_3$, $SrCO_3$, $Li_2CO_3$, $K_2CO_3$, $Na_2CO_3$, $Ba(NO_3)_2$, $Ca(NO_3)_2$, $Sr(NO_3)_2$, $LiNO_3$, $NaNO_3$, $KNO_3$, $MgO$, $Mg(NO_3)_2$, or combinations thereof, B is selected from the group of: Fe, Cu, Co or combinations thereof, and C is selected from the group of: PSZ, SSZ, SDC, Ce doped SSZ, GDC or combinations thereof, wherein A ranges from about 0.05 to about 20 wt %, B ranges from about 0.1 to about 70 wt % and C ranges from about 0.1 to about 60 wt % of the anode support; and wherein A is impregnated upon the anode support using liquid or gas phase impregnation wherein the promoter is Pr—Ni—Fe.

\* \* \* \* \*